(12) United States Patent
Carnevali

(10) Patent No.: US 7,802,768 B2
(45) Date of Patent: *Sep. 28, 2010

(54) TELESCOPING POLE MOUNT

(76) Inventor: Jeffrey D. Carnevali, 5957 Beach Dr. SW., Seattle, WA (US) 98136

( * ) Notice: Subject to any disclaimer, the term of this patent is extended or adjusted under 35 U.S.C. 154(b) by 785 days.

This patent is subject to a terminal disclaimer.

(21) Appl. No.: 11/118,734

(22) Filed: Apr. 29, 2005

(65) Prior Publication Data

US 2006/0255215 A1 Nov. 16, 2006

(51) Int. Cl.
*F16M 11/00* (2006.01)
*F16B 2/14* (2006.01)

(52) U.S. Cl. .............. 248/412; 248/125.8; 248/161; 248/188.5; 403/374.2; 403/109.5; 403/367

(58) Field of Classification Search .............. 248/188.5, 248/125.8, 188.4, 410, 168, 412, 413, 254.3, 248/354.4, 404, 405, 411, 414, 408, 14, 161, 248/295.114; 403/368, 377, 374.4, 109.1, 403/109.5, 374.2, 374.3, 297, 367; 211/204, 211/206

See application file for complete search history.

(56) References Cited

U.S. PATENT DOCUMENTS

| | | | | |
|---|---|---|---|---|
| 1,103,839 A | * | 7/1914 | Rellay | .................. 248/412 |
| 2,291,747 A | | 8/1942 | Neuwirth | |
| 2,507,760 A | * | 5/1950 | Dath | .................... 188/129 |
| 2,643,143 A | | 6/1953 | Torgny | |
| 2,850,308 A | * | 9/1958 | Le Febvre et al. | ........... 403/104 |
| 3,004,743 A | | 10/1961 | Wenger | |
| 3,737,136 A | | 6/1973 | Smurr | |
| 3,866,724 A | * | 2/1975 | Hollnagel | .................. 188/129 |
| 4,113,222 A | * | 9/1978 | Frinzel | ...................... 248/412 |
| 4,627,602 A | | 12/1986 | Sporck | |
| 4,695,021 A | * | 9/1987 | Leinfelder | .................. 248/168 |
| 4,706,916 A | * | 11/1987 | Cullmann et al. | ........... 248/168 |
| 4,928,916 A | | 5/1990 | Molloy | |
| 4,976,721 A | | 12/1990 | Blasnik | |

(Continued)

OTHER PUBLICATIONS 8 pages of Office Action dated Apr. 19, 2007 in related U.S. Appl. No. 11/125,700. (No reply drafted Cir filed to date.).

(Continued)

*Primary Examiner*—Amy J Sterling
*Assistant Examiner*—Tan Le
(74) *Attorney, Agent, or Firm*—Charles J. Rupnick, Attorney at Law

(57) ABSTRACT

A telescoping pole mount formed of an elongated male tube member that is slidable within an elongated female tube member. An internal locking mechanism for securing the telescoping pole at a selected elevation is provided as first and second cooperating wedges that are each structured to slide along a plane of mutual contact that is inclined relative to a longitudinal axis of the female tube member, the wedges are sized to slide within the female tube member with the first wedge being positioned within the female tube member exterior to a portion of the male tube member that is positioned within the female tube member. A lengthwise drive mechanism is coupled for driving the second wedge against the first wedge along the plane of contact and into an interlocked relationship therewith. A disengaging mechanism is provided for disengaging the wedges from their interlocked relationship.

14 Claims, 10 Drawing Sheets

U.S. PATENT DOCUMENTS

| | | | |
|---|---|---|---|
| 5,232,304 A * | 8/1993 | Huang | 403/374.4 |
| 5,897,268 A | 4/1999 | Deville | |
| 6,189,843 B1 | 2/2001 | Pfister | |
| 6,203,239 B1 * | 3/2001 | Mucciaccciaro et al. | 403/374.4 |
| 6,378,466 B1 | 4/2002 | Long | |
| 6,609,686 B2 | 8/2003 | Malizia | |
| 6,796,446 B2 * | 9/2004 | Segall et al. | 211/206 |
| 7,007,909 B2 * | 3/2006 | Hsieh | 248/412 |
| 7,398,952 B2 * | 7/2008 | Carnevali | 248/404 |
| 2006/0255215 A1 * | 11/2006 | Carnevali | 248/125.8 |
| 2006/0261221 A1 * | 11/2006 | Carnevali | 248/159 |

OTHER PUBLICATIONS 9 pages of Office Action dated Feb. 15, 2007 in related U.S. Appl. No. 11/120,286.

14 pages of Reply to Office Action dated Feb. 15, 2007 in related U.S. Appl. No. 11/120,286.

* cited by examiner

TELESCOPING POLE MOUNT

FIELD OF THE INVENTION

The present invention relates to a free standing telescoping pole mount for mounting an external device at a selected elevation, and in particular to a telescoping pole mount having an internal locking mechanism for securing the telescoping pole at a selected elevation, and having a mechanical arm that is rotational relative to the telescoping pole.

BACKGROUND OF THE INVENTION

Telescoping pole mounts are generally well known. However, lengthwise locking mechanisms of such known telescoping pole mounts in general tend to fail when any portion of the pole is rotated relative to another portion thereof. Subsequently, the telescoping portions of the pole become unlocked, and slide one within the other.

Consequently, it is desirable to have improvements in the lengthwise locking mechanisms of telescoping poles.

SUMMARY OF THE INVENTION

The present invention overcomes limitations of the prior art by providing a telescoping pole mount having an internal locking mechanism for securing the telescoping pole at a selected elevation, and a disengaging mechanism for disengaging the internal locking mechanism.

According to one aspect of the invention, the telescoping pole mount of the invention includes an elongated male tube member that is slidable within an elongated female tube member; the internal locking mechanism for securing the telescoping pole at a selected elevation is provided as first and second cooperating wedges that are each structured to slide along a plane of mutual contact that is inclined relative to a longitudinal axis of the female tube member, the first and second cooperating wedges are further sized to slide within the female tube member with the first wedge being positioned within the female tube member adjacent to a portion of the male tube member that is positioned within the female tube member; a lengthwise drive mechanism that is coupled for driving the second wedge against the first wedge along the plane of contact and into an interlocked relationship therewith; and the disengaging mechanism for disengaging the internal locking mechanism by disengaging the first and second wedges from their interlocked relationship.

According to another aspect of the invention, the disengaging mechanism of the invention is formed by a spring that is coupled for biasing the first and second wedges apart substantially along the longitudinal axis of the female tube member.

According to another aspect of the invention, the spring is a compression spring.

According to another aspect of the invention, the first and second cooperating wedges form a cavity therebetween with the compression spring positioned therein.

According to another aspect of the invention, the cavity is formed of a first cavity formed in the first wedge and a second cavity formed in the second wedge, with the first and second cavities communicating along a portion of the plane of mutual contact.

According to another aspect of the invention, the spring is a tension spring.

According to another aspect of the invention, the lengthwise drive mechanism is formed of a coupler between the second wedge and a portion of the male member that is positioned external of the female member, and an actuator that is structured for driving the coupler relative to the portion of the male member that is external of the female member; and a thrust bearing is interfaced between the actuator and the portion of the male member that is external of the female member.

According to another aspect of the invention, the thrust bearing is any one of a pin thrust bearing, a roller thrust bearing, and a ball thrust bearing.

According to another aspect of the invention, the a mechanical arm is interfaced between one end of the male tube member and the lengthwise drive mechanism, the mechanical arm being rotatable relative to the end of the male tube member. According to one aspect of the invention, the mechanical arm is formed of two parts: an inner arm portion that is rotatable relative to the end of the male tube member, and an outer arm portion that is rotatable relative to the inner arm portion at a position remote from the male tube member.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF PREFERRED EMBODIMENT

In the Figures, like numerals indicate like elements.

Figure 1:
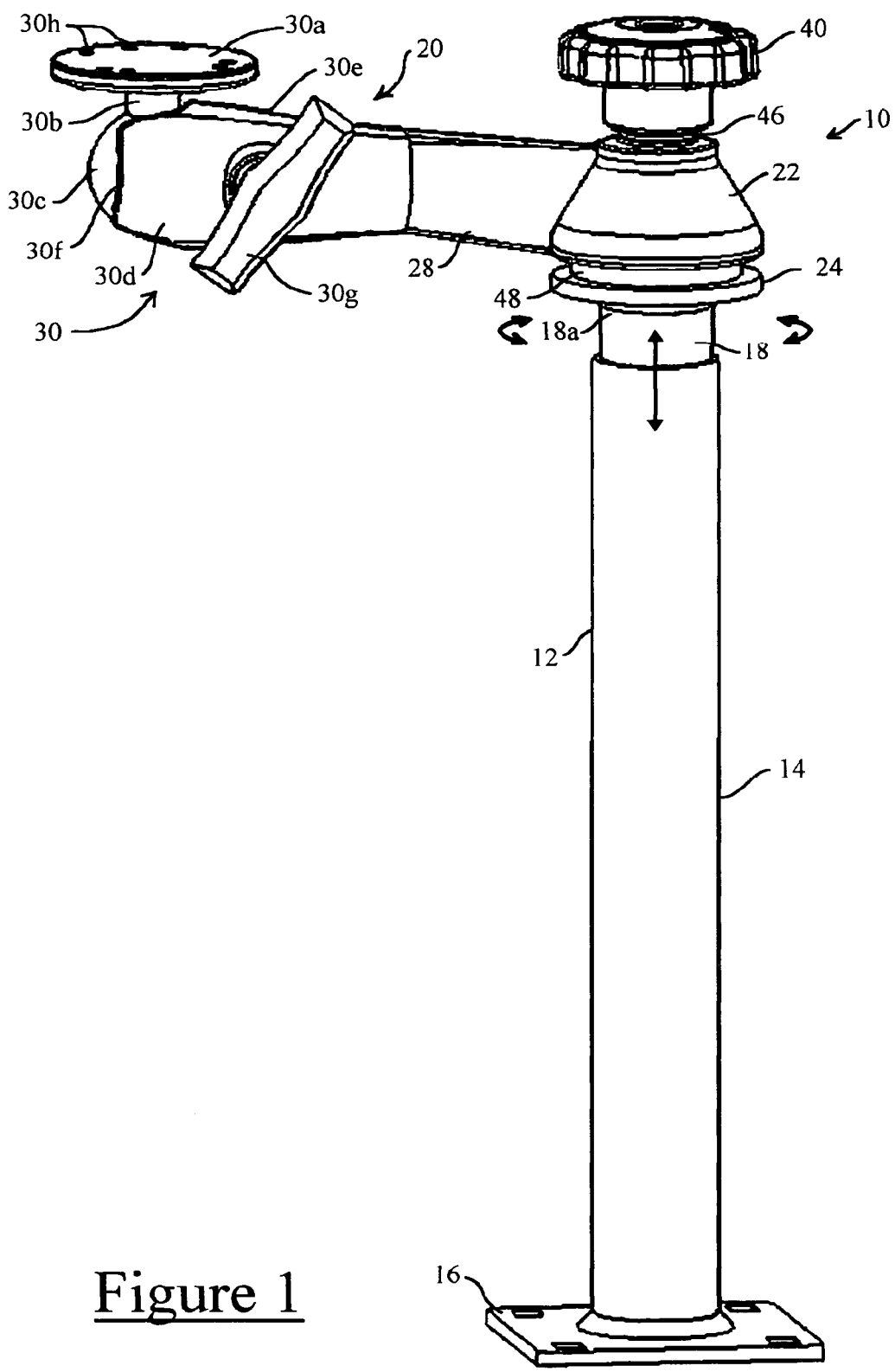
FIG. 1 is a perspective view that illustrates by example and without limitation the present invention embodied as a telescoping pole mount.

FIG. 1 illustrates the present invention by example and without limitation embodied as a telescoping pole mount 10 having at its core a telescoping pole 12 formed of an outer female tube 14 standing on a base plate 16, and an inner male tube 18 sized to slide lengthwise within the female tube 14, as indicated by the straight arrows, to different lengthwise relative positions. The relative positions of the female and male tubes 14, 18 of the telescoping pole 12 are arbitrary and are optionally reversed in a device that practices the present invention within the scope and intent of the present invention. A rotatable apparatus or mechanical arm 20 is mounted on the male tube 18 external to the female tube 14 and is rotatable about the telescoping pole 12, as indicated by the curved arrows, without unlocking the female and male tubes 14, 18.

According to embodiment, the rotatable mechanical arm 20 includes a hub 22 that rotates completely around the pole 12 on a substantially planar platform 24 that is optionally fixed stationary to one end 18a of the male tube 18 that remains external to the female tube 14. When stationary, the platform 24 is for example threaded, machined, molded, cast, welded or otherwise securely fixed to the external end 18a of the male tube 18. Alternatively, the platform 24 is free to rotate about the telescoping pole 12, as indicated by the curved arrows, without unlocking the female and male tubes 14, 18.

According to this embodiment of the invention, the rotatable arm 20 includes an arm 28 that extends away outward from the pole 12. By example and without limitation, the arm 28 culminates in a ball and socket mounting apparatus 30 of the type described in U.S. Pat. No. 5,845,885, which is incorporated by reference herein in its entirety. For example, the ball and socket mounting apparatus 30 provides a positionable mounting platform 30a extended on a post 30b from a sphere 30c of resiliently compressible material that is angularly and rotationally positionable between a pair of clamping arms 30d, 30e that together form a socket 30f that is clamped about the sphere 30c when a clamping mechanism 30g is engaged and tightened. The sphere 30c of resiliently compressible material is captured in the socket 30f by increased tightening of the clamping mechanism 30g to squeeze together the clamping arms 30d, 30e. The positionable mounting platform 30a (shown with a pattern of mounting holes 30h) is optionally structured to any device or structure of the user's choice.

Figure 2:
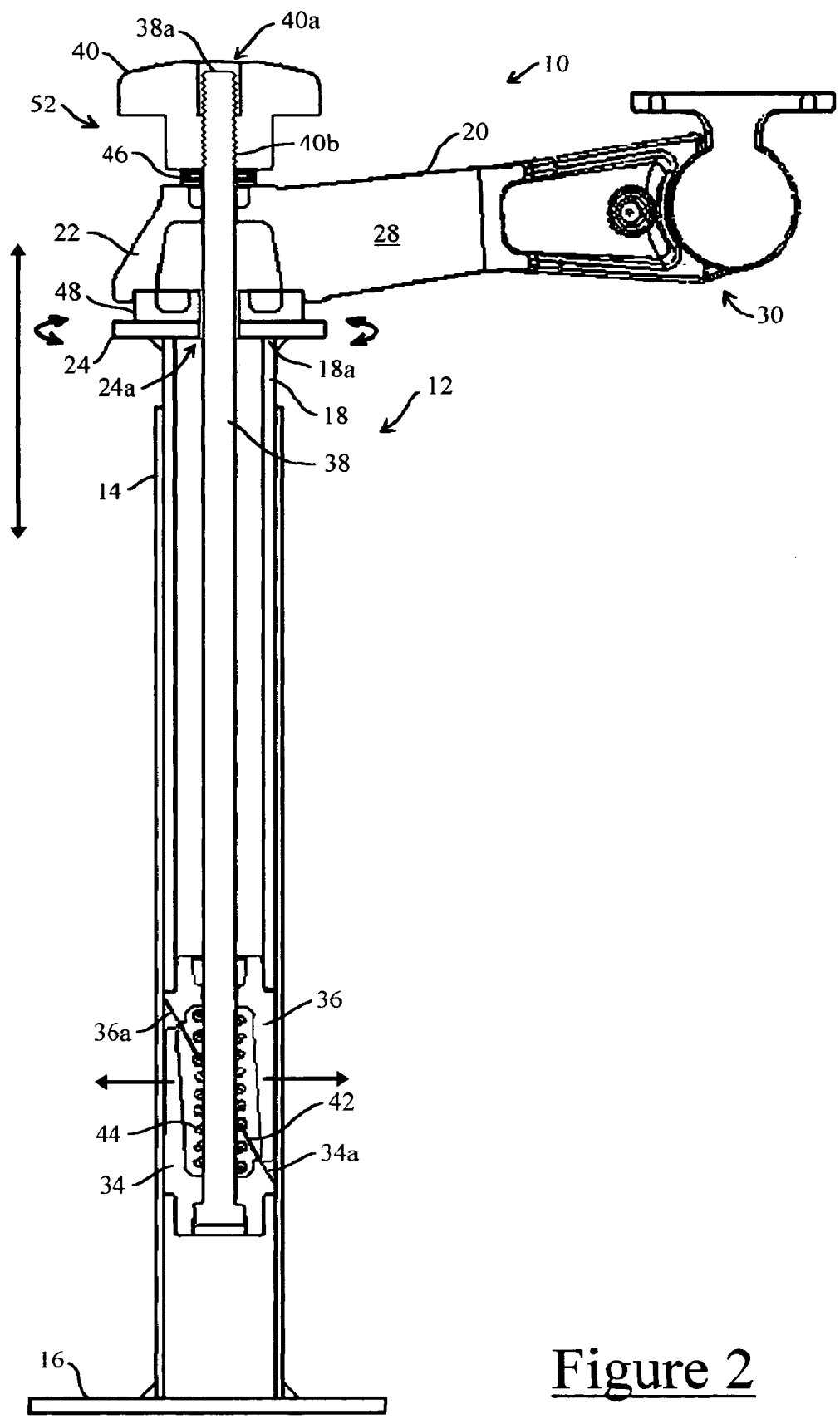
FIG. 2 is a cross sectional view that illustrates one embodiment of the telescoping pole mount of the invention.

FIG. 2 is a cross sectional view of the telescoping pole mount 10 of the invention that illustrates the telescoping pole 12 of the invention with the male tube 18 locked within the female tube 14 at a selected elevation by a lengthwise locking mechanism 32. According to one embodiment of the invention, the lengthwise locking mechanism 32 is formed by a pair of cooperating wedges 34, 36 that are forced apart laterally by sliding along a sharply inclined plane of mutual contact 42 that is formed between respective inclined surfaces 34a, 36a when their combined lengthwise dimension is forcefully compressed. According to one embodiment of the invention, the cooperating wedges 34, 36 are substantially identical in configuration so that a single wedge form or mold is used to produce both of the pair of cooperating wedges 34, 36. However, substantial identity between the cooperating wedges 34, 36 is not necessary and may be eliminated in a practical application of the invention, as discussed herein below.

A lengthwise drive mechanism 52 of the invention cooperates with the lengthwise locking mechanism 32 for driving the cooperating wedges 34, 36 together along the inclined plane of mutual contact 42. By example and without limitation, the lengthwise drive mechanism 52 of the invention is configured to pull the inclined surface 34a of the farther wedge 34 against the inclined surface 36a of the nearer wedge 36 along the inclined plane of mutual contact 42. According to one embodiment of the invention, the lengthwise drive mechanism 52 of the invention is configured having a coupler 38 that is coupled to the farther wedge 34 and extended past the nearer wedge 36 and through the male tube 18 and beyond the platform 24 at the male tube's external end 18a. An actuator 40 is coupled to the coupler 38 external of the male tube 18 for driving the coupler 38 relative to the platform 24. In other words, the actuator 40 is structured for drawing the farther wedge 34 against the nearer wedge 36 by pulling the coupler 38 along the male tube 18 toward the platform 24 at the male tube's external end 18a.

By example and without limitation, the coupler 38 is embodied as an elongated bolt or threaded rod 38 that is extended lengthwise through the two cooperating wedges 34, 36; the actuator 40 is embodied as a threaded knob actuator 40 that engages a first threaded end of the 38a of the coupler 38 external of the male tube 18 beyond the platform 24. Turning the knob actuator 40 against the external platform 24 pulls the end 38a of the coupler 38 through the male tube 18, which in turn causes the threaded rod coupler 38 to draw the farther wedge 34 lengthwise along the inside of the outer female tube 14. Other lengthwise drive mechanisms 52 are also contemplated for drawing the farther wedge 34 against the nearer wedge 36 and may be substituted without deviating from the scope and intent of the invention. For example, a cam and lever are optionally substituted for the threaded rod coupler 38 and knob actuator 40 of the lengthwise drive mechanism 52.

At least the threaded end 38a of the rod coupler 38 is extended external to the male tube 18 and platform 24 by, for example, passing though a clearance hole 24a through the platform 24 that is substantially aligned with the center of the male tube 18, and thus simultaneously substantially centers the rod coupler 38 relative to both of the surrounding tubes 14, 18. The knob actuator 40 is provided with a lengthwise bore 40a that is at least partially formed with an internal female thread 40b matched to male threads 38a formed on the rod coupler 38. Turning the knob actuator 40 pulls the rod coupler 38 through the male tube 18, which simultaneously draws the farther cooperating wedge 34 lengthwise of the female tube 14 and against the nearer cooperating wedge 36. The respective sharply inclined surfaces 34a, 36a of the cooperating wedges 34, 36 interact along a sharply inclined plane of mutual contact 42 which forces the cooperating wedges 34, 36 to move crosswise to one another and laterally of the female tube 14, as indicated by the outwardly pointing arrows. This relative crosswise motion drives the cooperating wedges 34, 36 to jam and wedge laterally against an inner wall 14a of the female tube 14. The cooperating wedges 34, 36 thus cause the locking mechanism 32 to fix the male tube 18 lengthwise of the female tube 14.

Reversing the knob actuator 40 lengthens the rod 38 within the male tube 18 and permits the farther wedge 34 to back away from the nearer wedge 36 along the plane of contact 42. With the lengthwise force of the rod coupler 38 removed, the wedges 34, 36 return to their normal positions central of the female tube 14. The lengthwise locking mechanism 32 is thereby released, which permits selective lengthwise adjustment of the male tube 18 relative to the female tube 14 before re-engaging the locking mechanism 32.

Figure 3:
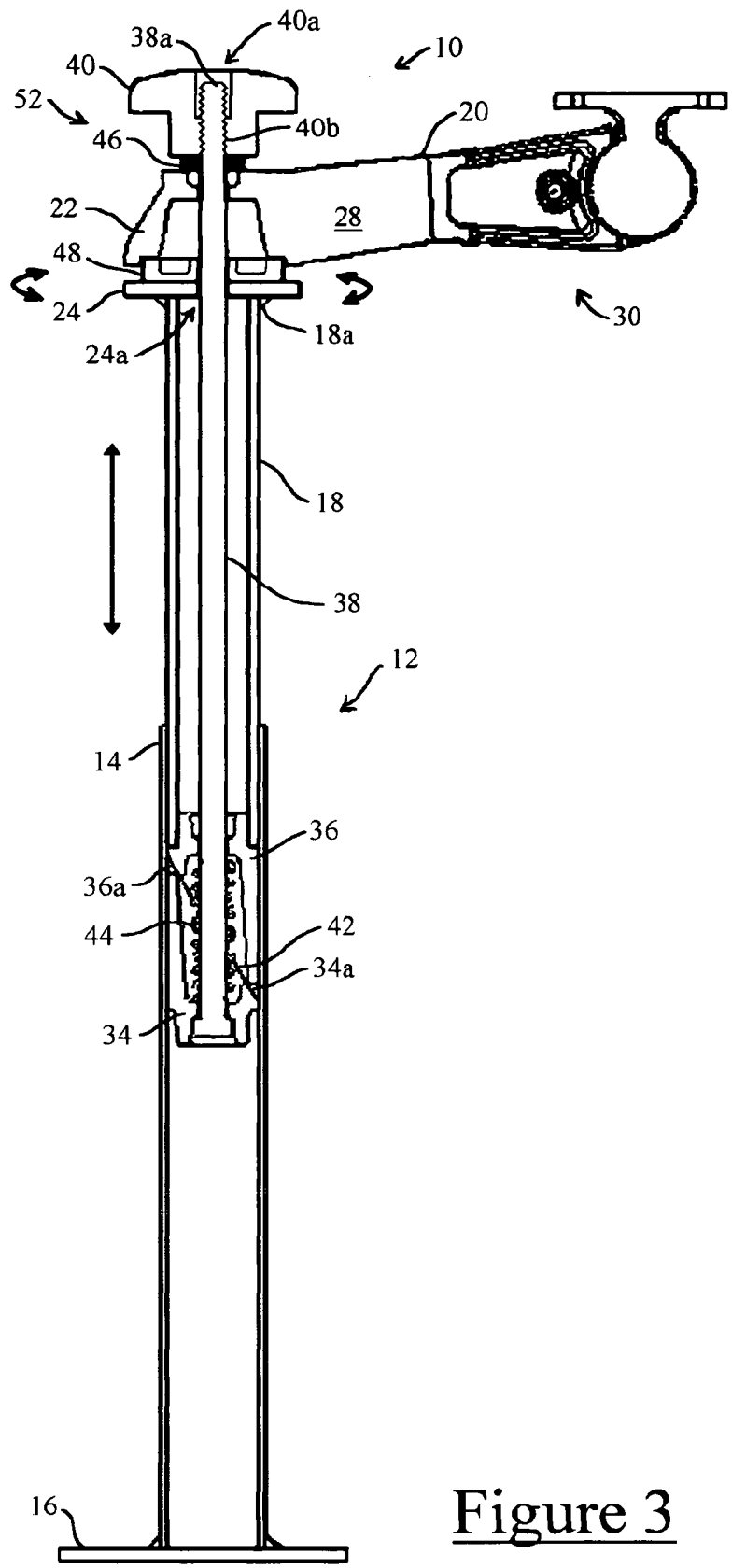
FIG. 3 is a cross sectional view of the telescoping pole mount of the invention that illustrates a male tube member being repositioned lengthwise of a female tube member.

FIG. 3 illustrates, by example and without limitation, the male tube 18 being repositioned lengthwise of the female tube 14.

Figure 4:
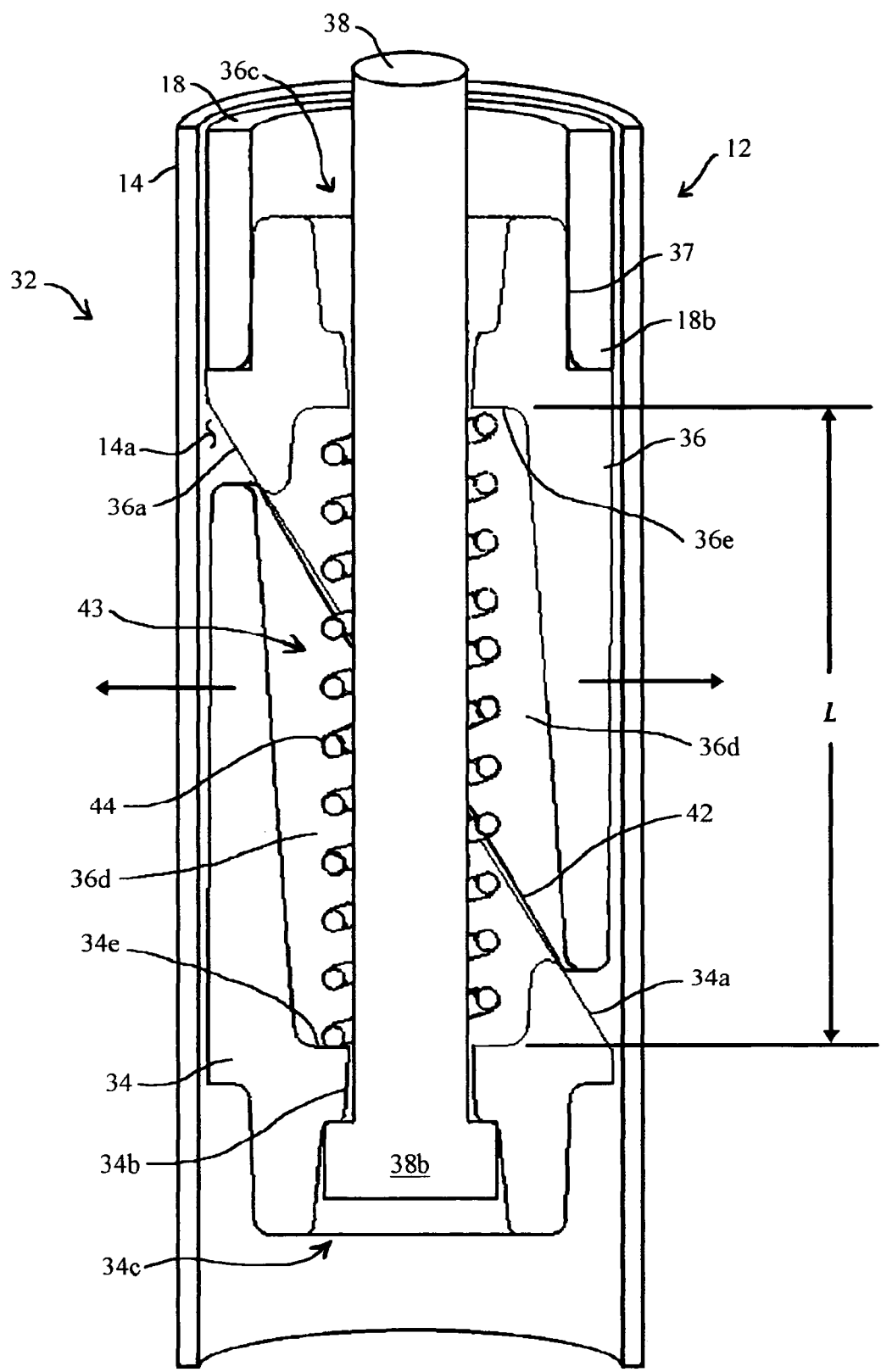
FIG. 4 is a close-up cross sectional view that illustrates one embodiment of a lengthwise locking mechanism of the invention.

FIG. 4 is a close-up view of the cooperating wedges 34, 36 of the lengthwise locking mechanism 32. A joint 37 is expected to be formed between the nearer wedge 36 and a second end 18b of the male tube 18 that remains within the female tube 14. Accordingly, the nearer wedge 36 is expected to be welded, threaded, swaged, keyed, pinned or otherwise coupled in a rotationally fixed relationship with the second end 18b of the male tube 18. By example and without limitation, the nearer wedge 36 is further formed with a lengthwise clearance passage 36b that is sized to slidingly pass the rod coupler 38 therethrough without appreciable interference and yet simultaneously substantially center the rod coupler 38 relative to both the wedge 36 and the surrounding tubes 14, 18. However, frictional forces may adequately substitute for expressly fixing the nearer wedge 36 relative to the male tube 18.

The farther wedge 34 and the rod coupler 38 are expected to be mutually structured to be rotationally fixed relative to one another. By example and without limitation, the wedge 34 is fixed to a second end 38b of the rod coupler 38 opposite from the first threaded end 38a. By example and without limitation, the farther wedge 34 is formed with a lengthwise clearance passage 34b that is sized to slidingly pass the rod coupler 38 therethrough, but is undersized relative to the oversized head 38b of the rod coupler 38. According to one embodiment of the invention, the farther wedge 34 and the oversized head 38b of the rod coupler 38 are structured in a mutually cooperative manner as to keep the rod coupler 38 from turning relative to the farther wedge 34. For example, the oversized rod head 38b is square or hex shaped and is sized to fit with a mating square or hex shaped socket 34c in the farther wedge 34 opposite from the incline surface 34a. According to one embodiment of the invention, the oversized head 38b is a nut, such as a locking nut, that is threaded onto the rod coupler 38 at the second end 38b opposite from the first end 38a. Alternatively, the wedge 34 is welded, threaded, swaged, keyed, pinned or otherwise coupled in a rotationally fixed relationship with the rod coupler 38, whereby the oversized head 38b may be eliminated. Any suitable structure for coupling the rod coupler 38 in a rotationally fixed relationship with the farther wedge 34 may be substituted without deviating from the scope and intent of the invention. Additionally, although the farther wedge 34 and the rod coupler 38 are expected to include such structure for being mutually rotationally fixed, frictional forces may adequately substitute for expressly fixing the farther wedge 34 relative to the rod coupler 38.

The nearer wedge 36 is optionally provided with a socket 36c opposite from the incline surface 36a to be consistent with the optional identity of the two wedges 34, 36. However, as discussed above, substantial identity between the cooperating wedges 34, 36 is not necessary. Therefore, the socket 36c may be eliminated in practice of the invention.

Turning the knob actuator 40 pulls the rod coupler 38 through the male tube 18 and draws the oversized head 38b of the rod coupler 38 toward the nearer wedge 36, which in turn draws the farther cooperating wedge 34 lengthwise along the inside of the outer female tube 14 and against the nearer cooperating wedge 36. Upon contact, the respective sharply inclined surfaces 34a, 36a of the cooperating wedges 34, 36 interact along an inclined plane of contact 42. The nearer wedge 36 cannot retreat relative to the male tube 18 that is strong enough to resist the stress in the rod coupler 38. Therefore, the continued action of the knob actuator 40 through the rod coupler 38 forcefully draws the farther wedge 34 to move along the plane of contact 42 crosswise to the nearer wedge 36 and laterally of the female tube 18, as indicated by the outward pointing arrows. According to one embodiment of the invention, the cooperating wedges 34, 36 are both sized to slide within the female tube 14 with little clearance. Therefore, crosswise and lateral motion drives the cooperating wedges 34, 36 to jam and wedge against an inner wall 14a of the female tube 14. The cooperating wedges 34, 36 thus cause the locking mechanism 32 to fix the male tube 18 lengthwise of the female tube 14.

Reverse turning of the knob actuator 40 reverses the rod coupler 38 into the male tube 18 and permits the farther wedge 34 to back away from the nearer wedge 36 along the plane of contact 42. With the lengthwise tension of the rod coupler 38 thus relieved, both wedges 34, 36 return to their normal positions central of the female tube 14. The lengthwise locking mechanism 32 is thus released, which permits selective adjustment of the male tube 18 relative to the female tube 14.

According to one embodiment of the invention, one or both the female and male tubes 14, 18 are round. Accordingly, they may be mutually rotatable so the apparatus or arm 20 can be rotated about the telescoping pole 12 even if it is fixed to the external end 18a of the male tube 18. Engaging the lengthwise locking mechanism 32 additionally secures the tubes 14, 18 against mutual rotation while simultaneously fixing the length or extension of the telescoping pole 12.

According to one embodiment of the invention, the female and male tubes 14, 18 are formed with cooperating shapes, such as mating square or hex shapes, so that they are substantially restricted against mutual rotation by their cooperating shapes. Accordingly, engaging the lengthwise locking mechanism 32 merely fixes the relative lengthwise positions of the tubes 14, 18 for fixing the length or extension of the telescoping pole 12.

Re-engaging the locking mechanism 32 fixes the male tube 18 in a new position relative to the female tube 14, as illustrated by example and without limitation in FIG. 3.

Also illustrated here is one exemplary embodiment of the invention for overcoming the disengagement resistance of prior art wedge mechanisms. In prior art devices, a sharp rap or other activation must be applied to disengage prior art wedge mechanisms from their interlocked relationship because they became so effectively jammed against one another and the wall of the tubes.

According to one embodiment of the invention, a disengaging mechanism 43 is provided for disengaging the wedges 34, 36 from their interlocked relationship. As illustrated here, the disengaging mechanism 43 is embodied as a strong compression spring 44 for disengaging the wedges 34, 36, for example by pushing the farther wedge 34 away from the nearer wedge 36. For example, the compression spring 44 is positioned between the cooperating wedges 34, 36. By example and without limitation, the wedges 34, 36 are formed with respective lengthwise hollow cavities 34d, 36d that communicate with one another along the plane of contact 42. The compression spring 44 is compressed to fit into the communicating cavities 34d, 36d. The spring 44 is sized having an uncompressed length that is longer than a combined length of the communicating lengthwise cavities 34d, 36d in the respective wedges 34, 36. When the farther wedge 34 is drawn against the nearer wedge 36, the compression spring 44 is compressed within the lengthwise cavities 34d, 36d between their opposing respective floor portions 34e, 36e. However, when effectively compressed, the compressed length of the spring 44 does not interfere with engagement of the inclined wedge surfaces 34a, 36a along the plane of contact 42 and consequent lateral spreading of the wedges 34, 36 during engagement of the locking mechanism 32.

Upon relief of the lengthwise tension of the rod coupler 38, expansion spring force in the compressed spring 44 operates against the opposing floor portions 34e, 36e of the wedge lengthwise cavities 34d, 36d. The expansion spring force operates to push apart and disengage the two interacting wedges 34, 36 to release the lengthwise locking mechanism 32. The expansion force in the spring 44 is sufficiently strong that, when the tension in the lengthwise rod coupler 38 is relieved, decompression and expansion of the spring 44 overcomes the jamming force that holds the wedges 34, 36 against the inner wall 14a of the female tube 14. Disengagement from the tube inner wall 14a permits the wedges 34, 36 to return to their normal positions central of the female tube 14 where they slide freely. The lengthwise locking mechanism 32 is released, and the male tube 18 is free to be repositioned relative to the female tube 14.

Figure 5:
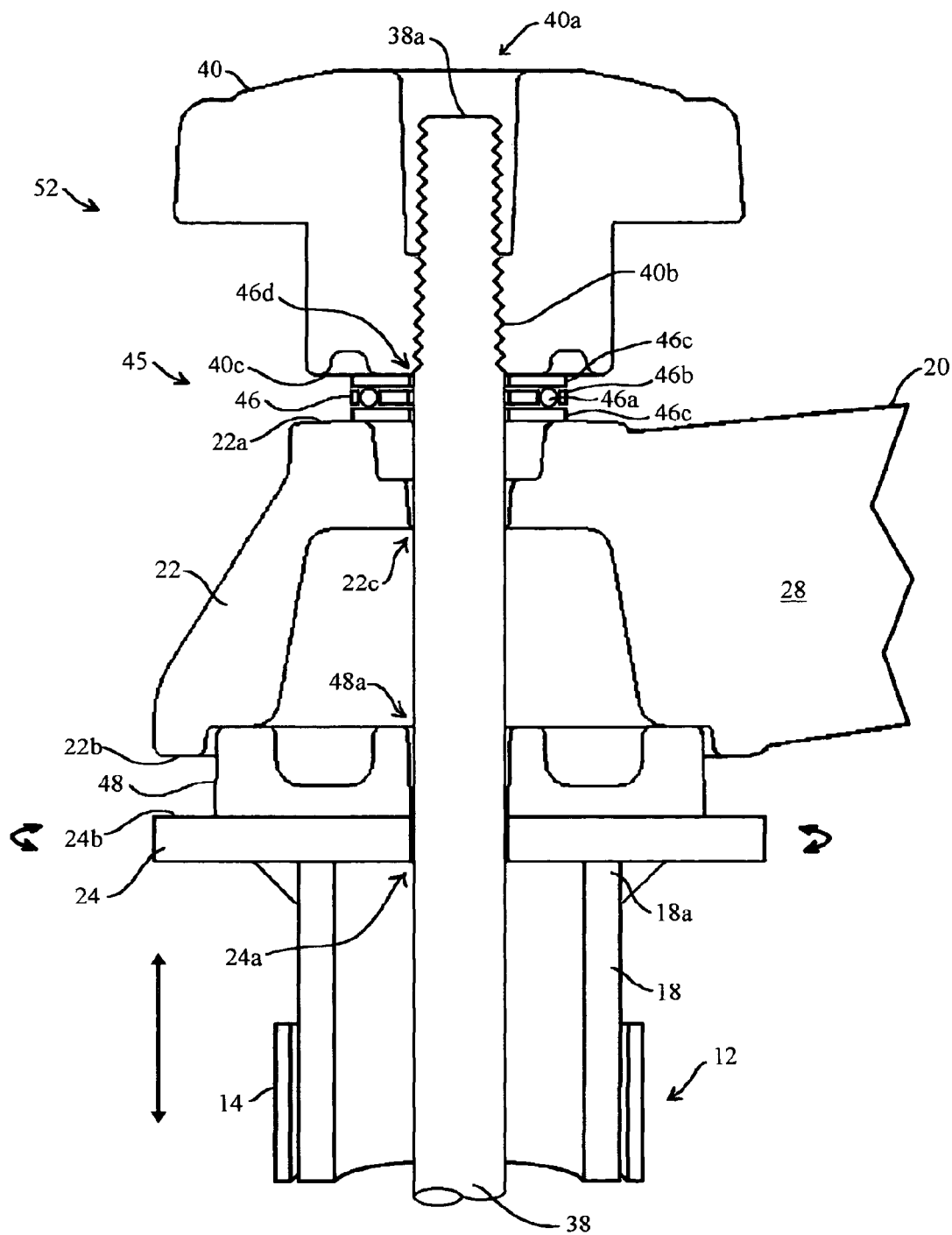
FIG. 5 is a close-up cross sectional view that illustrates one embodiment of a lengthwise drive mechanism of the invention for activating the lengthwise locking mechanism of the invention.

FIG. 5 illustrates one embodiment of a lengthwise drive mechanism 52 of the invention for drawing the rod coupler 38 through the male tube 18 and pulling the farther wedge 34 against the nearer wedge 36 along the inclined plane of contact 42. By example and without limitation, lengthwise drive mechanism 52 of the invention is provided as the knob actuator 40. According to one embodiment of the invention by example and without limitation, the knob actuator 40 is provided with a lengthwise bore 40a having an internal female thread 40b that is attached to male threads formed on the threaded end 38a of the rod coupler 38 opposite from the oversized head 38b. Alternatively, the rod coupler 38 is optionally so threaded for substantially its entire length. Turning the knob actuator 40 causes a contact surface 40c of the knob actuator 40 to act against the external platform 24 to draw the threaded rod coupler 38 through the platform 24 and pulls it through the male tube 18, as discussed herein. According to different embodiments of the invention, the knob actuator 40 alternatively works either directly against a contact surface 24b of the platform 24 (shown in subsequent Figures), or through the intervening hub 22 of the rotatable arm 20 (shown here).

The hub 22 of the rotatable arm 20 is structured to rotate about the telescoping pole 12 even while the lengthwise locking mechanism 32 is fully engaged for fixing the female and male tubes 14, 18 relative to one another. The inventor of the present invention has determined through experimentation that, without an interface structure between the threaded knob actuator 40 and the platform 24 for decoupling rotations of the rotatable arm 20 from the knob contact surface 40c, the threaded knob actuator 40 invariably loosens on the threaded rod end 38a when the arm 20 is rotated in the thread direction. Loosening of the knob actuator 40 relieves the tension in the rod coupler 38 and releases the lengthwise locking mechanism 32. The inner male tube 18 is then able to move freely within the outer female tube 14. Such loosening of the threaded knob actuator 40 and consequent release of the lengthwise locking mechanism 32 defeats the purpose of structuring the mechanical arm 20 to rotate about the telescoping pole 12.

By example and without limitation, one exemplary embodiment a decoupling mechanism 45 of the invention is illustrated for decoupling rotation of the rotatable mechanical arm 20 from the actuator knob's contact surface 40c and thereby overcoming the loosening of the lengthwise locking mechanism 32. A thrust bearing 46 is installed to interface between the contact surface 40c of the threaded knob actuator 40 and the contact surface 24b of the platform 24. When the rotatable mechanical arm 20 is installed between the threaded knob actuator 40 and platform 24, as shown, the thrust bearing 46 is interfaced between the actuator knob's contact surface 40c and a first contact surface 22a of the presentation platform's hub 22. The thrust bearing 46 decouples the rotational drive of the hub's contact surface 22a from the actuator knob's contact surface 40c. The thrust bearing 46 thus permits the hub 22 to rotate in either direction about the telescoping pole 12 without affecting the firmly threaded relationship between the rod end 38a and the threaded knob actuator 40. The thrust bearing 46 is, by example and without limitation, any form of conventional thrust bearing, including a pin thrust bearing, a roller thrust bearing, and a ball thrust bearing. For example, the thrust bearing 46 is structured of a quantity of hardened pins, rollers or balls 46a evenly distributed within a cage 46b between a pair of smooth plates or washers 46c. The washers 46c interface with the different contact surfaces 22a, 40c of the hub 22 and knob actuator 40, respectively. The hardened pins, rollers or balls 46a interface between the opposing washers 46c. According to one embodiment of the invention, the thrust bearing 46 includes a clearance passage 46d central of the cage 46b and washers 46c that admits passage of the threaded rod coupler 38 therethrough and that simultaneously serves to center the thrust bearing 46 within its space between the hub 22 and the threaded knob actuator 40 and to retain it in position during operation.

The thrust washer 46 has been determined to support any load that can be generated between the respective hub and knob interface surfaces 22a and 40c. Intervention of the thrust washer 46 has been determined to effectively decouple rotations of the rotatable mechanical arm 20 from the knob contact surface 40c such that the threaded knob actuator 40 invariably retains its threaded relationship with the threaded rod end 38a when the mechanical arm 20 is rotated in any direction, including the thread direction. The novel thrust bearing 46 interfaced between the actuator knob's contact surface 40c and the hub's contact surface 22a thus permits relative rotation of the mechanical arm 20, while the integrity of the threaded relationship between the rod end 38a and knob actuator 40 is maintained and effectiveness of the locking mechanism 32 remains uncompromised.

An optional bushing 48 may be interfaced between a second opposite contact surface 22b of the hub 22 portion of the rotatable mechanical arm 20 and the stationary platform's contact surface 24b for easing rotation of the mechanical arm 20 relative to the platform 24. For example, the bushing 48 is formed in a thick washer shape having a central passage 48a for clearance of the rod coupler 38. The bushing 48 is formed of a conventional material, such as nylon, Teflon®, or Delrin®, or another bushing material. Alternatively, another thrust bearing 46 is substituted for the bushing 48 between the hub's second contact surface 22b and the platform's contact surface 24b.

Also illustrated is a clearance passage 22c through the hub 22 that is sized to pass the threaded rod coupler 38 and thereby retain alignment of the rotatable mechanical arm 20 relative to the telescoping pole 12 during rotation thereabout.

Figure 6:
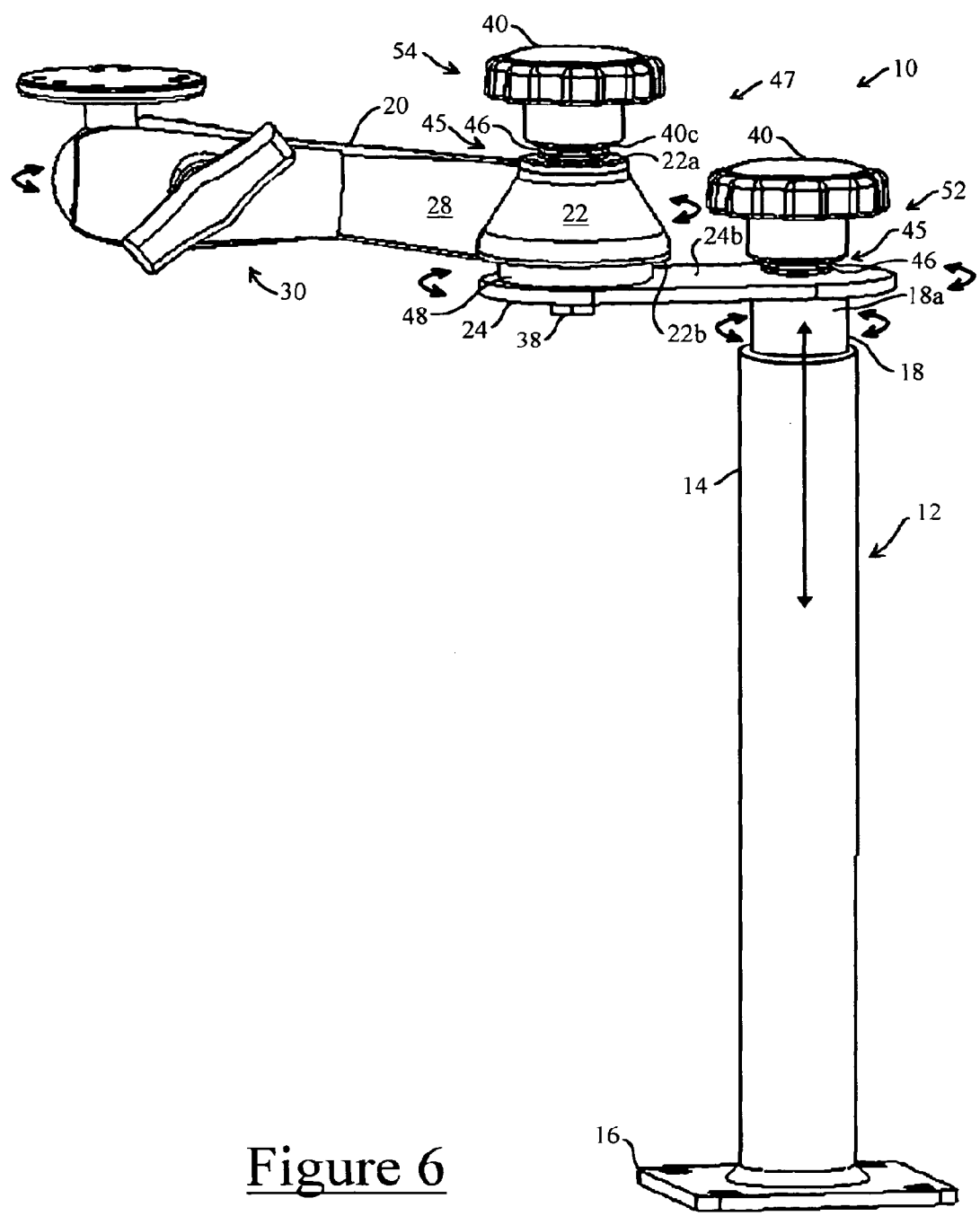
FIG. 6 is a perspective view that illustrates by example and without limitation one alternative embodiment of the telescoping pole of the present invention having a double arm mechanism.

FIG. 6 illustrates the telescoping pole 12 of the present invention alternatively embodied as having a first one of the threaded knob actuators 40 alternatively positioned to work against the platform 24, without intervention of the rotatable mechanical arm 20, for operating the lengthwise locking mechanism 32 and thereby fixing the elevation of the telescoping pole 12. Here the male tube 18 and the optionally stationary platform 24 fixed on its exterior end 18a together can be rotated relative to the telescoping pole 12 while the locking mechanism 32 is relaxed, when one or both of the tubes 14, 18 are round. However, when the locking mechanism 32 is engaged, the optionally stationary platform 24 is fixed to the male tube 18 so that it is not rotatable relative to the telescoping pole 12, as contrasted with the rotation of the mechanical arm 20 relative to the platform 24. Therefore, only a common flat washer 50 is provided for interfacing between the first knob actuator's contact surface 40c and the platform's contact surface 24b for easing turning of the knob actuator 40. According to one embodiment of the invention, the decoupling mechanism 45 of the invention is optionally interfaced between the first actuator knob's contact surface 40c and the stationary platform's contact surface 24b for further easing turning of the knob actuator 40. For example, either the thrust bearing 46 or bushing 48 is optionally interfaced between the first actuator knob's contact surface 40c and the stationary platform's contact surface 24b. However, the thrust bearing 46 and bushing 48 interfaces are unnecessary because the platform 24 is fixed to the male tube 18 so that it is not rotatable relative to the telescoping pole 12 as contrasted with the rotation of the rotatable mechanical arm 20 relative to the platform 24. Therefore, no opportunity is presented for loosening the knob actuator 40 on the threaded rod end 38a through rotation of the intervening platform 24.

As illustrated here, the platform 24 is enlarged relative to embodiments illustrated in previous figures, and the rotatable mechanical arm 20 is positioned remotely from the telescoping pole 12. When the telescoping pole 12 has been extended to a selected elevation and fixed by operation of the lengthwise locking mechanism 32, as detailed in subsequent figures, the mechanical arm 20 is rotatable relative to the enlarged platform 24 at its remote position from the telescoping pole 12. A lengthwise clamping mechanism 54 fixes the rotatable hub 22 firmly against the platform 24 so that the rotatable mechanical arm 20 neither tips nor wobbles when loaded, yet the mechanical arm 20 is fully rotatable relative to the platform 24. According to one embodiment of the invention, the lengthwise clamping mechanism 54 includes a second decoupling mechanism 45 of the invention for decoupling rotation of the rotatable mechanical arm 20 and thereby overcoming the loosening of the lengthwise clamping mechanism 54.

Optionally, another bushing 48 may be interfaced between the second opposite contact surface 22b of the hub 22 of the rotatable mechanical arm 20 and the stationary platform's contact surface 24b for easing rotation of the mechanical arm 20 relative to the platform 24.

According to one embodiment of the invention, the platform 24 is rotatable relative to the end 18a of the male tube 18. Therefore, the platform 24 is a second rotatable apparatus or mechanical arm that is mounted on the male tube 18 external to the female tube 14 and is rotatable about the telescoping pole 12, as indicated by the curved arrows, without unlocking the female and male tubes 14, 18. According to this embodiment of the invention, the external end 18a of the male tube 18 is substantially planar such that the platform 24 slides on the tube end 18a for being rotated about the telescoping pole 12. The rotatability of the platform 24 causes the rotatable apparatus or mechanical arm to be formed of two parts: an inner arm 24 and the outer arm 20, together a double arm mechanism 47. In other words, the double arm mechanism 47 is formed by inner arm platform 24 and outer arm 20 that operate as respective upper arm and forearm of the human anatomy and are interconnected by an elbow joint that is represented by the hub 22 of the outer arm 20 that is rotatable relative to the enlarged platform 24 at its remote position from the telescoping pole 12. The shoulder joint is represented by the enlarged platform 24 that is rotatable relative to the male tube 18 at the end of the telescoping pole 12. A hand portion of the two-part mechanical arm is represented by, for example, the ball and socket mounting apparatus 30 of the type described in U.S. Pat. No. 5,845,885.

Figure 7:
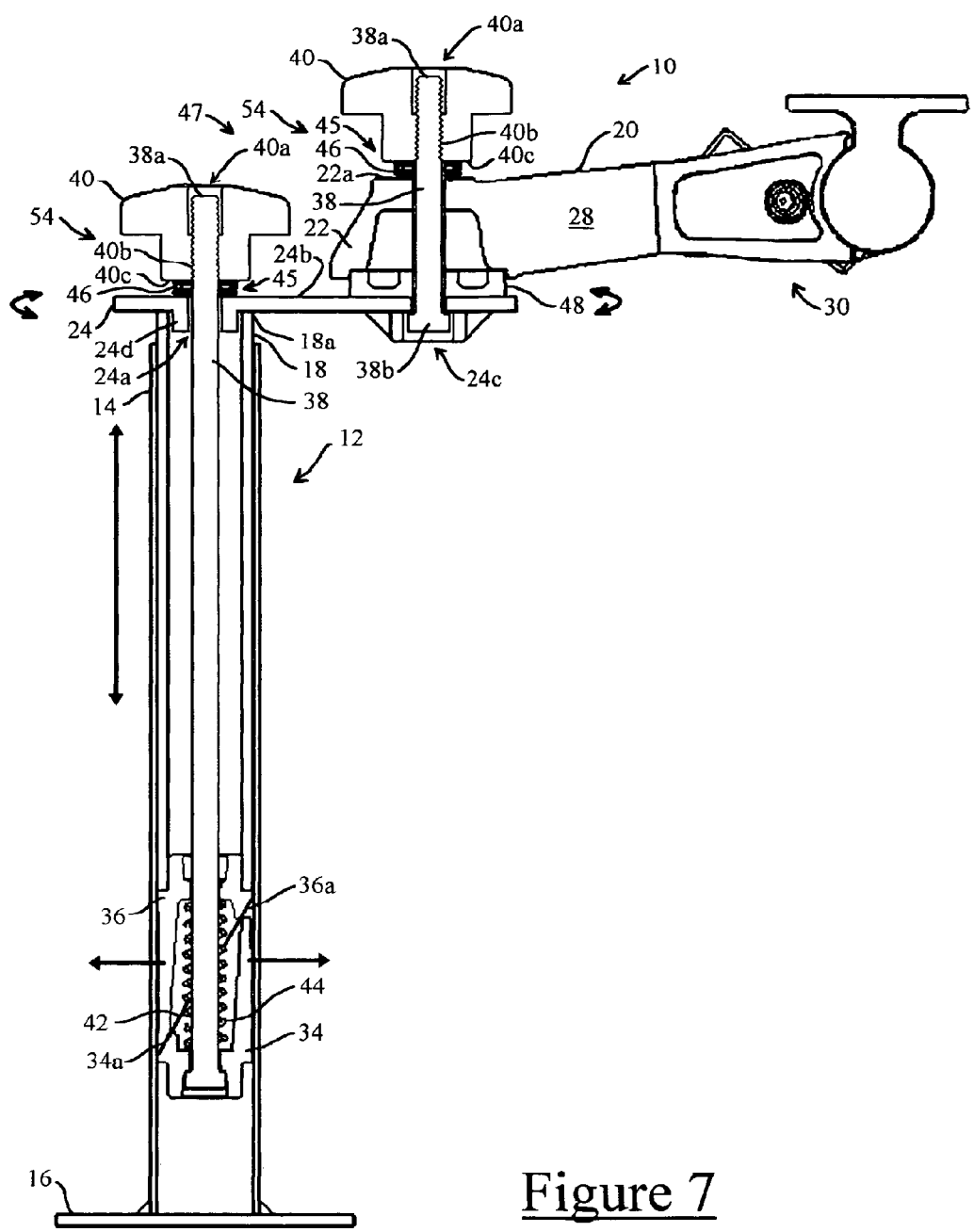
FIG. 7 is a cross sectional view that illustrates an alternative embodiment of the lengthwise locking mechanism of the invention.

FIG. 7 illustrates an alternative embodiment of the lengthwise locking mechanism 32 having the knob actuator 40 operating against the enlarged stationary or optionally rotatable platform 24. Optionally, the thrust bearing 46 (shown) or the bushing 48 may be interfaced between the first actuator knob's contact surface 40c and the stationary platform's contact surface 24b for easing turning of the first knob actuator 40 for engaging the cooperating wedges 34, 36 of the lengthwise locking mechanism 32. The lengthwise locking mechanism 32 operates as discussed herein.

Also illustrated is the lengthwise clamping mechanism 54 for fixing the rotatable hub 22 firmly against the platform 24 so that the rotatable mechanical arm 20 neither tips nor wobbles when loaded, yet permits the mechanical arm 20 to rotate fully relative to the platform 24.

According to one embodiment of the invention, the lengthwise clamping mechanism 54 that fixes the rotatable hub 22 firmly against the platform 24, and simultaneously permits the mechanical arm 20 to rotate fully relative to the platform 24 is embodied as a second coupler 38 in cooperation a second actuator 40. A second decoupling mechanism 45 of the invention is interfaced between the second actuator knob 40 and the rotatable arm 20 for decoupling rotation of the rotatable mechanical arm 20 from the second actuator knob's contact surface 40c and thereby overcoming the loosening of the lengthwise clamping mechanism 54. For example, a second thrust bearing 46 is interfaced between the second actuator 40 and the hub 22 of the rotatable arm 20. The second coupler 38 is extended beyond the enlarged platform 24 remotely from the telescoping pole 12.

The mechanical arm 20 is rotatable relative to the enlarged platform 24 by the second coupler 38 passing through the hub 22. The second actuator 40 is, for example, a second knob that is threaded onto a threaded end 38a of the second coupler 38 for securing the hub 22 in such manner as to permit the mechanical arm 20 to rotate about the second coupler 38 relative to the enlarged platform 24. According to one embodiment of the invention, the second decoupling mechanism 45 of the invention is embodied as the second thrust bearing 46 that is interfaced between the second knob actuator's contact surface 40c and the first contact surface 22a of the hub 22. The second thrust bearing 46 effectively decouples the rotational drive of the hub's contact surface 22a from the second knob actuator's contact surface 40c, which permits the hub 22 to rotate in either direction about the second coupler 38 without affecting the threaded relationship between the threaded end 38a of the second coupler 38 and the second knob actuator 40, i.e., without loosening the second knob actuator 40 on the second coupler 38 when the hub 22 is rotated in the thread direction.

According to one embodiment of the invention, the platform 24 and the remote rotatable mechanical arm 20 together form respective inner and outer portions of the double arm mechanism 47. The platform 24 is thus rotatable relative to the end 18a of the male tube 18, whereby the platform 24 is a second rotatable apparatus or mechanical arm that is mounted on the male tube 18 external to the female tube 14 and is rotatable about the telescoping pole 12, as indicated by the curved arrows, without unlocking the female and male tubes 14, 18. Accordingly, the platform 24 is structured to relative to the substantially planar external end 18a of the male tube 18. For example, when the enlarged platform 24 is rotatable relative to the end 18a of the male tube 18, it is optionally formed with a spud 24d for alignment with the male tube 18. The clearance hole 24a is sufficient to maintain the coupler 38 in substantial alignment with the platform 24 and the male tube 18 of the telescoping pole 12.

Figure 8:
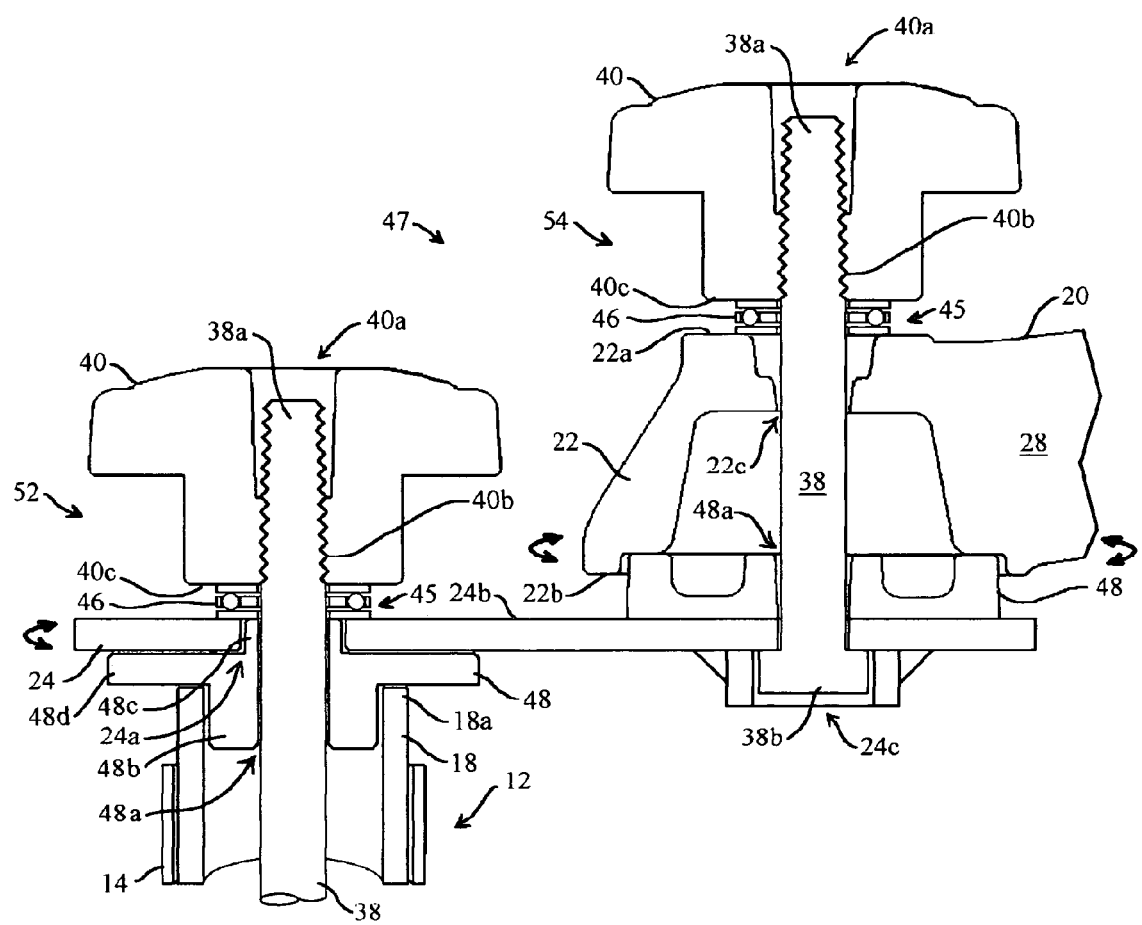
FIG. 8 is a close-up cross sectional view that illustrates one embodiment of the lengthwise drive mechanism of the invention of the invention.

FIG. 8 illustrates one embodiment of the lengthwise drive mechanism 52 of the invention of the invention for drawing the length of the rod coupler 38 through the male tube 18 for pulling the farther wedge 34 against the nearer wedge 36 along the inclined plane of mutual contact 42. By example and without limitation, turning the threaded knob actuator 40 causes the knob actuator's contact surface 40c to act against the contact surface 24b of the external platform 24 for drawing the rod coupler 38 through the platform 24 and progressively drawing it through the male tube 18, as discussed herein. According to different embodiments of the invention, the knob actuator 40 alternatively works either directly against a contact surface 24b of the platform 24 (shown here), or through the intervening hub 22 of the mechanical arm 20 (shown in previous Figures). Optionally, the decoupling mechanism 45 of the invention is included as part of the lengthwise drive mechanism 52 for easing rotation of the threaded knob actuator 40 relative to the contact surface 24b of the platform 24. For example, the thrust washer 46 optionally interfaces between the knob actuator's contact surface 40c and the stationary platform's contact surface 24b. Optionally, the bushing 48 may be interfaced between the knob actuator's contact surface 40c and the stationary platform's contact surface 24b for easing rotation of the threaded knob actuator 40 relative to the platform's contact surface 24b.

The platform 24 is optionally stationary relative to the end 18a of the male tube 18.

According to one embodiment of the invention, the platform 24 and the remote rotatable mechanical arm 20 together form respective inner and outer portions of the double arm mechanism 47. Accordingly, the platform 24 is rotatable relative to the end 18a of the male tube 18, whereby the platform 24 is a second rotatable apparatus or mechanical arm that is mounted on the male tube 18 external to the female tube 14 and is rotatable about the telescoping pole 12, as indicated by the curved arrows, without unlocking the female and male tubes 14, 18. Accordingly, the platform 24 is structured to relative to the substantially planar external end 18a of the male tube 18. For example, when the enlarged platform 24 is rotatable relative to the male tube 18, thee bushing 48 is optionally interfaced between the platform 24 the male tube end 18a. The bushing 48 is optionally formed with a spud 48b for alignment with the male tube 18, while the clearance hole 48a is sufficient to maintain the coupler 38 in substantial alignment with the platform 24 and the male tube 18 of the telescoping pole 12. A sleeve portion 48c of the bushing within the clearance hole 24a decouples rotations of the platform 24 from the coupler 38, while a flange portion 48d decouples the rotations of the platform 24 from the end 18a of the male tube 18.

Also illustrated here is the lengthwise clamping mechanism 54 for fixing the rotatable hub 22 firmly against the platform 24 at a remote location from the telescoping pole 12 so that the rotatable mechanical arm 20 neither tips nor wobbles when loaded, yet the mechanical arm 20 is fully rotatable relative to the platform 24.

According to one embodiment of the invention, the lengthwise clamping mechanism 54 includes the second bolt or threaded rod coupler 38 in cooperation the second threaded knob actuator 40. The second decoupling mechanism 45 of the invention is interfaced between the second knob actuator 40 and the hub 22 of the rotatable arm 20. By example and without limitation, the second decoupling mechanism 45 of the invention is provided as the second thrust bearing 46 that is interfaced between the second knob actuator 40 and the hub 22 of the rotatable arm 20. The threaded end 38a of the second coupler 38 is extended beyond the contact surface 24b of the enlarged platform 24 at a position located remotely, i.e., spaced away, from the telescoping pole 12.

According to one embodiment of the invention, the oversized head 38b of the second coupler 38 and a remote portion of the enlarged platform 24 are structured in a mutually cooperative manner as to keep the second coupler 38 from turning relative to the platform 24. For example, the second coupler 38 is a conventional bolt having an enlarged square or hex shaped head 38b that is sized to fit with a mating square or hex shaped socket 24c in the platform 24 opposite from the contact surface 24b. According to one embodiment of the invention, the second coupler 38 is a rod threaded substantially its entire length and the oversized head 38b is a nut, such as a locking nut, that is threaded onto the second coupler 38 at the second end 38b opposite from the first threaded end 38a. Alternatively, the enlarged platform 24 is welded, threaded, swaged, keyed, pinned or otherwise coupled in a rotationally fixed relationship with the second coupler 38, whereby the oversized head 38b may be eliminated. Any suitable structure for coupling the second coupler 38 in a rotationally fixed relationship with the enlarged platform 24 may be substituted without deviating from the scope and intent of the invention. Additionally, although the enlarged platform 24 and the second coupler 38 are expected to include such structure for being mutually rotationally fixed, frictional forces may adequately substitute for expressly fixing the second coupler 38 relative to the enlarged platform 24.

The hub 22 of the rotatable mechanical arm 20 is structured to rotate relative to the enlarged platform 24 even while the lengthwise clamping mechanism 54 is fully engaged for clamping the rotatable arm 20 firmly to the platform 24. According to one embodiment of the invention, the hub 22 of the mechanical arm 20 is formed with the clearance passage 22c that is sized to pass the second bolt or rod coupler 38. The second knob actuator 40 is firmly threaded to the threaded end 38b of the second coupler 38 and thereby retains the rotatable mechanical arm 20 in firm contact with the contact surface 24b of the enlarged platform 24 even during rotation thereabout.

The inventor of the present invention has determined through experimentation that, without an interface structure between the second threaded knob actuator 40 and the platform 24 for decoupling rotations of the mechanical arm 20 from the second actuator knob's contact surface 40c, the second threaded knob actuator 40 invariably loosens on the threaded coupler end 38a when the arm 20 is rotated in the thread direction. Loosening of the second threaded knob actuator 40 relieves the tension in the second coupler 38 and releases the lengthwise clamping mechanism 54. The rotatable mechanical arm 20 is then able to tip and wobble freely relative to the platform 24. Such loosening of the second threaded knob actuator 40 and consequent release of the lengthwise clamping mechanism 54 defeats the purpose of structuring the mechanical arm 20 to rotate about the second coupler 38.

By example and without limitation, the second decoupling mechanism 45 of the invention is provided for decoupling rotation of the rotatable mechanical arm 20 from the second actuator knob's contact surface 40c and thereby overcoming the loosening of the lengthwise clamping mechanism 54. The second decoupling mechanism 45 of the invention is provided as the second thrust bearing 46 which is installed to interface between the contact surface 40c of the second knob actuator 40 and the first contact surface 22a of the rotatable presentation platform's hub 22. The second thrust bearing 46 decouples the rotational drive of the hub's contact surface 22a from the second actuator knob's contact surface 40c. The thrust bearing 46 thus permits the hub 22 to rotate in either direction about the second coupler 38 without affecting the firmly threaded relationship between the second coupler's threaded end 38a and the second threaded knob actuator 40. The thrust bearing 46 is, by example and without limitation, any form of conventional thrust bearing, including a pin thrust bearing, a roller thrust bearing, and a ball thrust bearing, as discussed herein, with the central clearance passage 46d fit over the second coupler 38, which simultaneously serves to center the second thrust bearing 46 within its space between the hub 22 and the second threaded knob actuator 40 and to retain it in position during operation.

The thrust bearing 46 has been determined to support any practical load that can be generated between the respective hub and second knob interface surfaces 22a and 40c. Intervention of the second thrust bearing 46 has been determined to effectively decouple rotations of the rotatable mechanical arm 20 from the second knob contact surface 40c such that the second threaded knob actuator 40 invariably retains its threaded relationship with the threaded end 38a of the second coupler 38 when the mechanical arm 20 is rotated in any direction, including the thread direction. The novel interfacing of the second thrust bearing 46 between the second actuator knob's contact surface 40c and the hub's contact surface 22a thus permits relative rotation of the mechanical arm 20, while the integrity of the threaded relationship between the threaded end 38a of the second coupler 38 and the second threaded knob actuator 40 is maintained and effectiveness of the clamping mechanism 54 remains uncompromised.

Optionally, the bushing 48 may be interfaced between the second contact surface 22b of the hub 22 portion of the rotatable mechanical arm 20 and the stationary platform's contact surface 24b for easing rotation of the mechanical arm 20 relative to the platform 24. Alternatively, another thrust bearing 46 is substituted for the bushing 48 between the hub's second contact surface 22b and the platform's contact surface 24b.

Figure 9:
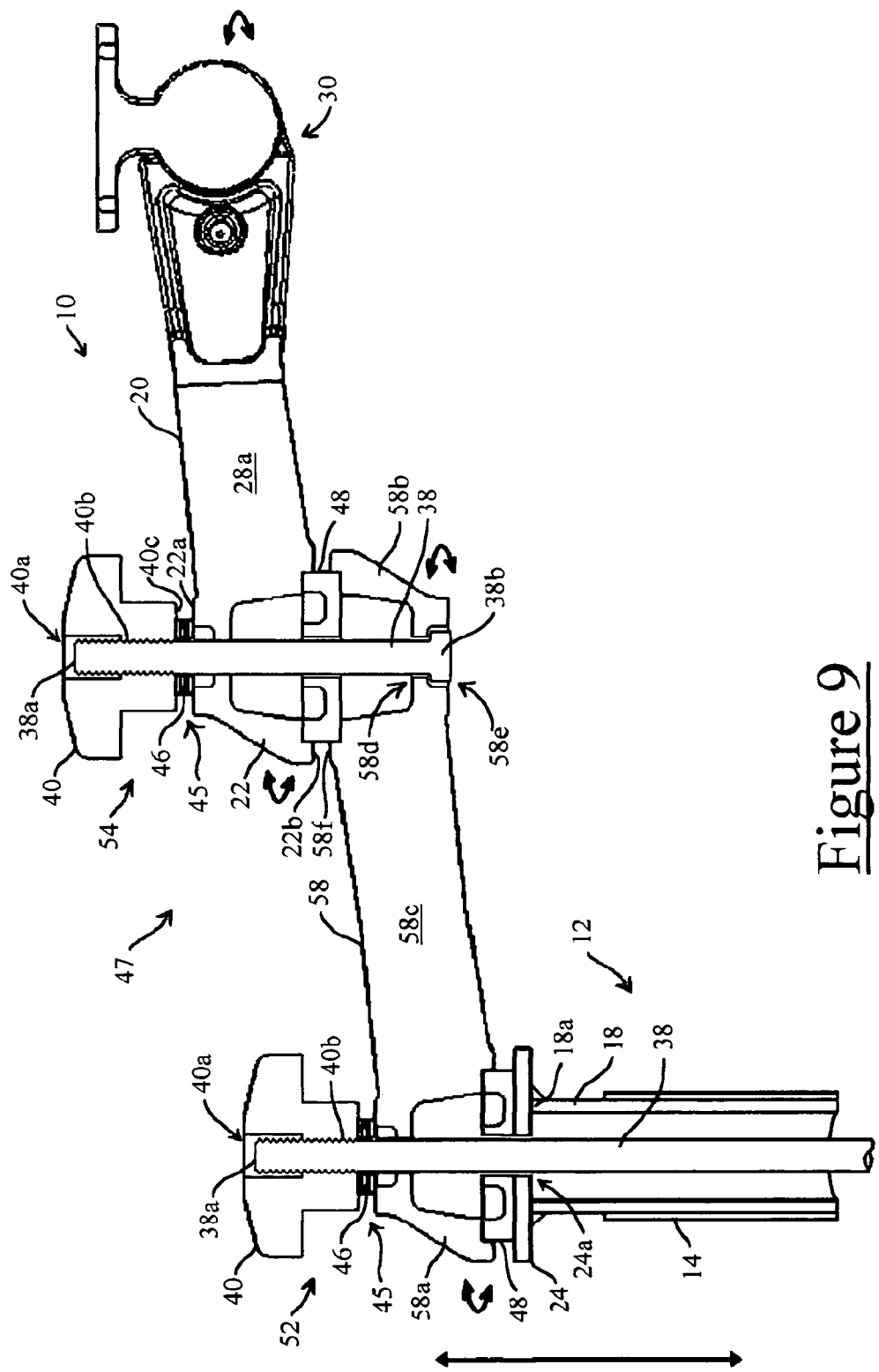
FIG. 9 is a close-up cross sectional view that illustrates one alternative embodiment of the telescoping pole of the present invention having a double arm mechanism.

FIG. 9 illustrates an alternative embodiment of the telescoping pole mount 10 having the double arm mechanism 47. As illustrated here, the double arm mechanism 47 is formed of the remote rotatable mechanical arm 20 together with a second inner mechanical arm 58 that is rotatable relative to the end 18a of the male tube 18. The second mechanical arm 58 is formed with a hub 58a that is substantially the same as the hub 22 of the arm 20 illustrated in earlier Figures and operates substantially the same. Optionally, the bushing 48 may be interfaced between the hub 58a and the platform 24 for easing rotation of the arm 58 about the telescoping pole 12. The mechanical arm 58 includes a second substantially identical hub 58b that is spaced remotely from the pole 12 by an arm extension 58c that interconnects the remote hub 58b to the hub 58a at the pole 12. The remote rotatable mechanical arm 20 is coupled for rotation relative to the inner arm's second hub 58b by the lengthwise clamping mechanism 54 that fixes the remote arm's rotatable hub 22 firmly against the inner arm's second hub 58b. By example and without limitation, the second coupler 38 operates in cooperation the second actuator 40 to rotatably couple the two hubs 22 and 58b. The second coupler 38 is coupled through the clearance passage 22c through the remote hub 22 and a similar clearance passage 58d through the inner arm's second hub 58b.

According to one embodiment of the invention, the oversized head 38b of the second coupler 38 and inner arm's second hub 58b are structured in a mutually cooperative manner as to keep the second coupler 38 from turning relative to the inner arm's second hub 58b. For example, the second coupler 38 is a conventional bolt having an enlarged square or hex shaped head 38b that is sized to fit with a mating square or hex shaped socket 58e in the hub 58b opposite from a contact surface 58f of the hub 58b. According to one embodiment of the invention, the bushing 48 is optionally interfaced between the second opposite contact surface 22b of the remote hub 22 portion of the remote mechanical arm 20 and the contact surface 58f of the inner arm's second hub 58b for easing rotation of the remote mechanical arm 20.

A second decoupling mechanism 45 of the invention is interfaced between the second actuator knob 40 and the remote hub 22 for decoupling rotation of the remote mechanical arm 20 from the second actuator knob's contact surface 40c, thereby overcoming the loosening of the lengthwise clamping mechanism 54. For example, a second thrust bearing 46 is interfaced between the second actuator 40 and the hub 22 of the remote rotatable mechanical arm 20.

illustrates an alternative embodiment of the disengaging mechanism 43 of the invention for disengaging the wedges 34, 36 from their interlocked relationship upon relief of the lengthwise tension of the threaded coupler 38. As illustrated here, the disengaging mechanism 43 is embodied as the strong compression spring 44 for disengaging the wedges 34, 36 by pushing the farther wedge 34 away from the nearer wedge 36. As illustrated here, the compression spring 44 is positioned between the cooperating wedges 34, 36 external of the lengthwise hollow cavities 34d, 36d and the plane of contact 42. By example and without limitation, the wedges 34, 36 are formed with opposing ledges or annular flanges 34f, 36f on respective external lengthwise surfaces 34g, 36g of the wedges 34, 36. The compression spring 44 is sized having an uncompressed length that is longer the spacing between the opposing annular flanges 34f, 36f such that the compression spring 44 is compressed to fit between the annular flanges 34f, 36f when the farther wedge 34 is drawn against the nearer wedge 36. However, when effectively compressed, the compressed length of the spring 44 does not interfere with engagement of the inclined wedge surfaces 34a, 36a along the plane of contact 42 and consequent lateral spreading of the wedges 34, 36 during engagement of the locking mechanism 32. Upon relief of the lengthwise tension of the threaded rod coupler 38, the expansion spring force in the compressed spring 44 operates against the opposing annular flanges 34f, 36f of the wedges 34, 36. The expansion spring force operates to push apart and disengage the two interacting wedges 34, 36 to release the lengthwise locking mechanism 32. The expansion force in the spring 44 is sufficiently strong that, when the tension in the lengthwise rod coupler 38 is relieved, decompression and expansion of the spring 44 overcomes the jamming force that holds the wedges 34, 36 against the inner wall 14a of the female tube 14.

The respective lengthwise hollow cavities 34d, 36d are irrelevant, except as means for lightening the wedges 34, 36 by removing unnecessary material.

Figure 10:
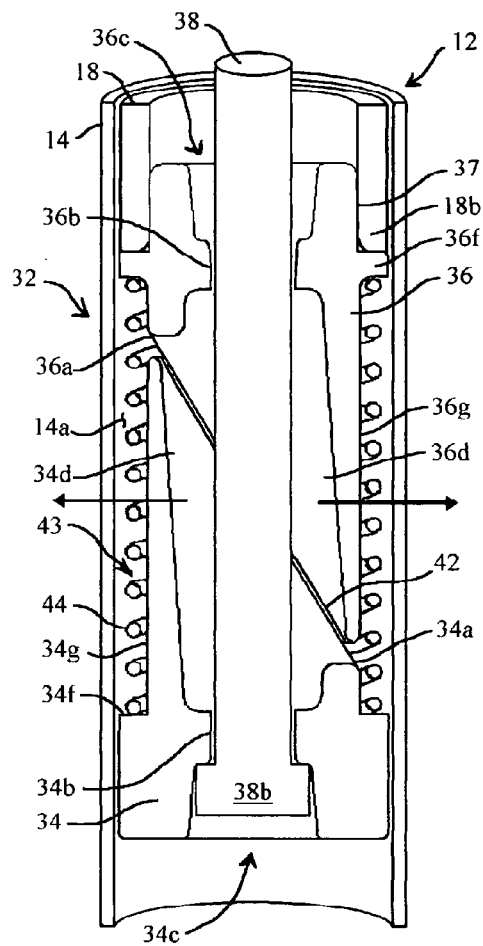
FIG. 10 is a close-up cross sectional view that illustrates an alternative embodiment of a disengaging mechanism of the invention for disengaging the lengthwise locking mechanism of the invention.
Figure 11:
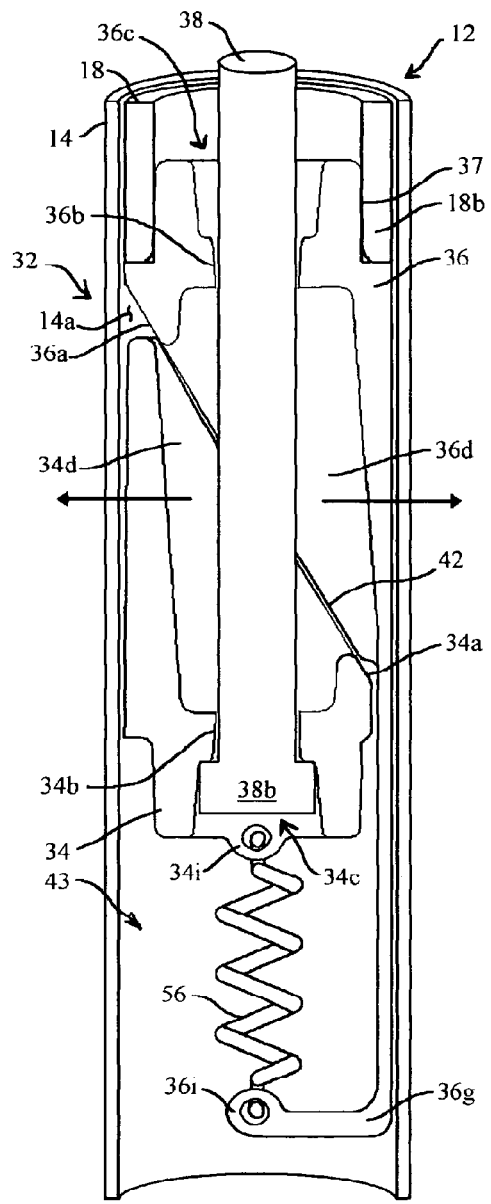
FIG. 11 is a close-up cross sectional view that illustrates another alternative embodiment of a disengaging mechanism of the invention for disengaging the lengthwise locking mechanism of the invention.

FIG. 10 illustrates another alternative embodiment of the disengaging mechanism 43 of the invention for disengaging the wedges 34, 36 from their interlocked relationship upon relief of the lengthwise tension of the threaded rod coupler 38. As illustrated here, the disengaging mechanism 43 is embodied as strong tension spring 56 for disengaging the wedges 34, 36 by pulling the farther wedge 34 away from the nearer wedge 36. As illustrated here, the tension spring 56 is positioned between the farther wedge 34 and an extension 34h of the nearer wedge 36 that is extended opposite from the inner male tube 18 beyond the farther wedge 34. By example and without limitation, the wedges 34, 36 are formed with opposing connectors 34i, 36i with the tension spring 56 stretched therebetween. The tension spring 56 is sized having an unstretched length that is shorter the spacing between the opposing connectors 34*i*, 36*i* such that the tension spring 56 must be stretched to fit between the opposing connectors 34*i*, 36*i* when the farther wedge 34 is drawn against the nearer wedge 36. Upon relief of the lengthwise tension of the threaded rod coupler 38, the tension spring force in the stretched spring 56 operates against the opposing connectors 34*i*, 36*i* of the wedges 34, 36 for pulling apart and disengaging the two interacting wedges 34, 36 to release the lengthwise locking mechanism 32. The tension spring 56 is sufficiently strong that, when the tension in the lengthwise rod coupler 38 is relieved, retraction of the stretched spring 56 overcomes the jamming force that holds the wedges 34, 36 against the inner wall 14*a* of the female tube 14.

The respective lengthwise hollow cavities 34*d*, 36*d* are irrelevant, except as means for lightening the wedges 34, 36 by removing unnecessary material.

While the preferred embodiment of the invention has been illustrated and described, it will be appreciated that various changes can be made therein without departing from the spirit and scope of the invention. For example, materials may be substituted for the different components of the flexible support apparatus of the invention without departing from the spirit and scope of the invention. Therefore, the inventor makes the following claims.

What is claimed is:

1. A telescoping pole mount, comprising:
an elongated male member that is slidable within an elongated female member;
first and second cooperating wedges each structured to slide along a plane of mutual contact that is inclined relative to a longitudinal axis of the female member, the first and second cooperating wedges being further sized to slide within the female member with the first wedge being positioned within the female member adjacent to a portion of the male member that is positioned within the female member;
a lengthwise drive mechanism that is coupled for driving the second wedge against the first wedge along the plane of contact, wherein the lengthwise drive mechanism further comprises:
a coupler between the second wedge and a portion of the male member that is positioned external of the female member, and
a rotational actuator that is structured for driving the coupler relative to the portion of the male member that is external of the female member, and
a thrust bearing interfaced for decoupling a rotational motion between the actuator and the portion of the male member that is external of the female member.

2. The telescoping pole mount of claim 1, further comprising a spring that is coupled for biasing the first and second wedges apart substantially along the longitudinal axis of the female member.

3. The telescoping pole mount of claim 2 wherein the spring further comprises a tension spring.

4. The telescoping pole mount of claim 1 wherein the thrust bearing is one of a pin thrust bearing, a roller thrust bearing, and a ball thrust bearing.

5. A telescoping pole mount, comprising:
a telescoping pole formed of a male tube that is slidable within a female tube along a longitudinal axis of the telescoping pole;
first and second cooperating wedges that are structured for sliding along a plane of mutual contact that is inclined relative to the longitudinal axis of the telescoping pole, and the first and second cooperating wedges being further structured for sliding within the female tube with the first wedge being coupled to a portion of the male tube positioned within the female tube and the first and second cooperating wedges further comprising a cavity formed therebetween comprising respective lengthwise hollow cavities formed in the first and second wedges, with the cavities communicating along a portion of the plane of mutual contact and each being formed with a respective floor portions opposite of the plane of mutual contact;
a lengthwise drive mechanism that is coupled for pulling the second wedge against the first wedge along the plane of contact; and
a compression spring that is coupled to bias the first and second wedges apart substantially along the longitudinal axis of the telescoping pole, wherein the compression spring is captured in the respective lengthwise hollow cavities formed in the first and second wedges between the respective floor portions.

6. A telescoping pole mount, comprising:
a telescoping pole formed of a male tube that is slidable within a female tube along a longitudinal axis of the telescoping pole;
first and second cooperating wedges that are structured for sliding along a plane of mutual contact that is inclined relative to the longitudinal axis of the telescoping pole, and the first and second cooperating wedges being further structured for sliding within the female tube with the first wedge being coupled to a portion of the male tube positioned within the female tube;
a lengthwise drive mechanism that is coupled for pulling the second wedge against the first wedge along the plane of contact, wherein the lengthwise drive mechanism further comprises:
an elongated coupler that is coupled to the second wedge and extends through the male tube substantially along the longitudinal axis of the telescoping pole to a platform fixed to a portion of the male tube positioned external to the female tube,
a actuator coupled to an end of the coupler that extends externally of the female tube, and
a thrust bearing interfaced between the fixed platform and a contact surface of the actuator and positioned for decoupling a rotational motion of the actuator from the fixed platform.

7. The telescoping pole mount of claim 6 wherein:
the end of the coupler that extends externally of the female tube further comprises a threaded rod; and
the actuator is formed with mating threads.

8. The telescoping pole mount of claim 6 wherein the elongated coupler further extends through the first wedge.

9. The telescoping pole mount of claim 6, further comprising a spring that is coupled to bias the first and second wedges apart substantially along the longitudinal axis of the telescoping pole.

10. The telescoping pole mount of claim 9 wherein the spring further comprises a tension spring.

11. A telescoping pole mount, comprising:
a telescoping pole having an inner tube structured to slide within an outer tube, the inner tube having a first end that is structured for being positioned internal of the outer tube and a second end that is structured for being positioned external of the outer tube and having a substantially planar contact surface structured thereon;
a lengthwise locking mechanism structured for fixing relative lengthwise positions of the inner and outer tubes, the lengthwise locking mechanism comprising:

first and second cooperating wedges that are sized to slide within the outer tube, wherein:

the first wedge is coupled to the inner tube adjacent to the end thereof that is internal of the outer tube;

the second wedge is spaced away from the inner tube and is positioned to slide relative to the first wedge along the plane of mutual contact that is inclined relative to a longitudinal axis of the inner tube;

a lengthwise coupling mechanism is coupled to the second wedge and having a partially extendable portion thereof that is partially extended external of the second end of the inner tube adjacent to the substantially planar contact surface structured thereon; and a lengthwise drive mechanism is coupled to the partially extendable portion of the lengthwise coupling mechanism that is extended external of the second end of the inner tube, the lengthwise drive mechanism is further operable on the partially extendable portion of the lengthwise coupling mechanism relative to the substantially planar contact surface of the second end of the inner tube for urging the second wedge toward the first wedge along the inclined plane of mutual contact.

12. The telescoping pole mount of claim 11 wherein:

the inner tube is positioned substantially within the outer tube with the first end being positioned internal of the outer tube and the second end having the substantially planar contact surface structured thereon being positioned external of the outer tube; and the first and second cooperating wedges being positioned internal of the outer tube.

13. The telescoping pole mount of claim 11 further comprising a bearing that is structured for decoupling a contact surface of the lengthwise drive mechanism from the substantially planar contact surface on the second end of the inner tube.

14. The telescoping pole mount of claim 11, further comprising a spring positioned to bias apart the first and second cooperating wedges.

* * * * *